Patented July 19, 1949

2,476,490

UNITED STATES PATENT OFFICE 2,476,490

PRODUCTION OF TRIFLUORO ACETIC ACID

Walter Norman Haworth and Maurice Stacey, Birmingham, England

No Drawing. Application September 17, 1946, Serial No. 697,577. In Great Britain October 1, 1945

7 Claims. (Cl. 260—539)

This invention relates to improvements in the production of organic compounds.

It is known that trifluoroacetic acid can be prepared by oxidising m-aminobenzotrifluoride with sodium dichromate and strong sulphuric acid. It is necessary to boil a mixture of the reactants for several days, and even so the yield is not satisfactory.

We have found that improved yields of trifluoroacetic acid can be prepared by reacting m-aminobenzotrifluoride with an alkali metal or alkaline earth metal permanganate while dissolved in a mixture of water with glacial acetic acid and/or trifluoroacetic acid. Preferably a mixture of water and trifluoroacetic acid is used as the solvent.

By this process oxidation of the m-aminobenzotrifluoride proceeds smoothly, and good yields can be obtained in the course of some hours.

m-Aminobenzotrifluoride is not appreciably soluble in water, but it is readily soluble in glacial acetic acid and in trifluoroacetic acid, and thus the reaction medium should contain sufficient of one, or of both, of these acids to bring the m-aminobenzotrifluoride into solution. The exact amount necessary in any given case will depend on the concentration of m-aminobenzotrifluoride used in the reaction. Thus, on the one hand by using 60% aqueous acetic acid a solution containing as much as 45% by weight of m-aminobenzotrifluoride can be prepared, and on the other hand by using 60% aqueous trifluoroacetic acid a solution containing as much as 50% by weight of m-aminobenzotrifluoride can be prepared. Similar strength solutions can be prepared from aqueous mixtures of trifluoroacetic acid and acetic acid. The water content of the solvent is suitably less than 50% by weight, and preferably between 35% and 45% by weight. When a suitable stock of trifluoroacetic acid has been collected it is unnecessary and undesirable to use acetic acid. The use of trifluoroacetic acid has the advantage that, as it is identical with the main product of the reaction, the subsequent recovery of a highly pure product is simplified though it should be noted that the lower boiling point of trifluoroacetic acid enables it to be separated readily from acetic acid.

The oxidation is conveniently carried out by warming the solution of m-aminobenzotrifluoride to temperatures of 25° C. or higher and gradually adding potassium permanganate, either dissolved in water or acetic acid or, preferably, as a solid in finely divided form. After oxidation is completed the products may be worked up in any suitable manner. Thus the manganese in solution may be precipitated as the dioxide by the addition of alkali, or otherwise, and filtered off. After rendering the filtered solution acid the trifluoroacetic acid may be isolated by extraction with a solvent immiscible with the reaction mixture such as ethyl ether. Where acetic acid is used in the solvent, the product may also be recovered by neutralising the reaction product with an alkali metal hydroxide, carbonate, or bicarbonate, evaporating the solution to dryness, and extracting the dry residue with a lower aliphatic alcohol, for example ethyl alcohol, so as to leave the alkali metal acetate undissolved, and to dissolve the corresponding trifluoroacetate; in general, for example if oxidation is effected with potassium permangante and the neutralisation with a sodium compound, a mixture of alkali metal trifluoroacetates will result. In carrying out a process in which the extraction is made with ethyl alcohol, barium permanganate is a convenient oxidising agent to use, since barium acetate, which will be formed, is insoluble in ethyl alcohol.

Thus, in one form of the invention 100 to 150 parts of m-aminobenzotrifluoride are dissolved in a mixture of 100 to 110 parts of glacial acetic acid with 70 to 80 parts of water, and the solution is then heated to between 90° C. and 100° C. in an apparatus fitted with a stirrer and a reflux condenser. Solid potassium permanganate is then gradually added. A vigorous reaction ensues with the evolution of gas, and the heating of the reaction mixture and the rate of addition of the permanganate should be so adjusted that a steady evolution of gas continues, but excessive rise in temperature is avoided. Water may be added from time to time to maintain the reaction mixture in suitably fluid condition. The addition of permanganate will take several hours, for example 10 to 15 hours, depending on the circumstances. When further addition of permanganate does not result in further vigorous evolution of gas and no tarry matter remains, the reaction may be deemed complete. The reaction mixture is then diluted with several times its volume of water, say 2 to 4 times it volume of water, rendered alkaline by the addition of caustic soda thereby causing manganese dioxide to be precipitated, and then neutralised with sulphuric acid. The precipitate is then filtered off and washed with hot water, the filtrate and washings evaporated to dryness, and the mixed sodium and potassium triflouoracetates extracted with ethyl alcohol. The resulting mixed salts may be recovered from the filtered extract by evaporating off the alcohol.

The resulting mixed salts may be treated if desired to recover the free acid by steam distilling an acidified aqueous solution of the salts, and the acid may be separated by fractional distillation or worked up to give the potassium salt or other salt which may be in turn converted to an alkyl ester and thence to the amide. Other derivatives of trifluoroacetic acid may be prepared by known methods from the salts or from the free acid.

The following example illustrates but does not limit the invention, all parts being by weight.

Example 150 parts of m-aminobenzotrifluoride were dissolved in a mixture of 105 parts of glacial acetic acid with 75 parts of water, and the mixture was then heated to between 80° C. and 90° C. in an apparatus fitted with a stirrer and a reflux condenser. Solid potassium permanganate was added gradually over the course of 12 hours to ensure a smooth steady reaction, approximately equal parts being added every 15 minutes, so that in all 200 parts were added. From time to time the sides of the vessel were washed down with small amounts of distilled water.

The reaction mixture was then diluted with twice its volume of water, made alkaline by the addition of solid caustic soda, and boiled for a short time with 50 parts of potassium permanganate to remove small amounts of tarry material and to bring any manganous hydroxide to readily filterable manganese dioxide. The liquid was then just neutralised by the addition of aqueous sulphuric acid and filtered while still hot, the manganese dioxide on the filter being washed with hot water and the washings added to the filtrate. The filtrate was then evaporated to dryness, and the residue extracted with 500 parts of ethyl alcohol, the solution was filtered to remove sodium and potassium acetates and the alcohol evaporated off from the filtrate. The extraction and evaporation procedure was repeated 3 times, and the residue was then completely soluble in alcohol.

This residue, which was a mixture of potassium and sodium trifluoroacetates with a small amount of the acetates, was then dissolved in water, the solution acidified with 200 parts of sulphuric acid, and the trifluoroacetic acid which was liberated was removed by steam distillation and collected in 150 parts of aqueous caustic potash. Excess potash was neutralised with sulphuric acid, and the resultant solution of potassium sulphate and potassium trifluoroacetate evaporated to dryness. The potassium trifluoroacetate was then isolated by extraction with ethyl alcohol in the manner described in the previous paragraph by which the mixed sodium and potassium salts were isolated.

104 parts of the potassium salt were thus obtained, corresponding to a 73.5% yield based on the m-aminobenzotrifluoride.

We claim:

1. A process for the production of trifluoroacetic acid from m-aminobenzotrifluoride which includes the step of reacting m-aminobenzotrifluoride with a salt of permanganic acid while dissolved in a liquid mixture comprising water and an acid selected from the group consisting of acetic acid and trifluoroacetic acid.

2. A process according to claim 1 in which the water content of said mixture is less than 50% by weight.

3. A process according to claim 1 in which the salt of permanganic acid is potassium permanganate.

4. A process according to claim 1 in which the salt of permanganic acid is barium permanganate.

5. A process for the production of trifluoroacetic acid from m-aminobenzotrifluoride which includes the step of reacting m-aminobenzotrifluoride with barium permanganate while dissolved in aqueous acetic acid containing more than 50% $CH_3COOH$ by weight, the barium permanganate being added gradually to the reaction mixture.

6. A process for the production of trifluoroacetic acid from m-aminobenzotrifluoride which includes the step of reacting m-aminobenzotrifluoride with a salt of permanganic acid under reflux conditions while dissolved in a liquid mixture comprising water, acetic acid and trifluoroacetic acid, the water content of said liquid mixture being between 35% and 45% by weight.

7. A process for the production of trifluoroacetic acid from m-aminobenzotrifluoride which includes the step of reacting m-aminobenzotrifluoride with an alkali metal permanganate at a temperature in the range 80° C.–100° C. while dissolved in aqueous trifluoroacetic acid containing more than 50% $CF_3COOH$ by weight, the alkali metal permanganate being added gradually in solid form to the reaction mixture.

WALTER NORMAN HAWORTH.
MAURICE STACEY.

REFERENCES CITED

The following references are of record in the file of this patent:

UNITED STATES PATENTS

| Number | Name | Date |
| --- | --- | --- |
| 2,371,757 | Henne | Mar. 20, 1945 |
| 2,414,706 | Babcock et al. | Jan. 21, 1947 |

OTHER REFERENCES

Swarts' Chem. Abstracts, vol. 17, page 769 (1923).